(12) United States Patent
Hecht et al.

(10) Patent No.: US 8,919,217 B2
(45) Date of Patent: Dec. 30, 2014

(54) HANDHELD POWER TOOL WITH A SHIFTABLE GEAR

(75) Inventors: Joachim Hecht, Magstadt (DE); Martin Kraus, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1330 days.

(21) Appl. No.: 12/629,604

(22) Filed: Dec. 2, 2009

(65) Prior Publication Data

US 2010/0132497 A1 Jun. 3, 2010

(30) Foreign Application Priority Data

Dec. 2, 2008 (DE) .......................... 10 2008 044 273

(51) Int. Cl.
| | |
|---|---|
| *B60K 20/00* | (2006.01) |
| *G05G 9/00* | (2006.01) |
| *E21B 3/00* | (2006.01) |
| *E21B 17/22* | (2006.01) |
| *E21B 19/16* | (2006.01) |
| *E21B 19/18* | (2006.01) |
| *B25F 5/00* | (2006.01) |
| *B23B 45/00* | (2006.01) |

(52) U.S. Cl.
CPC .............. *B25F 5/001* (2013.01); *B23B 45/008* (2013.01)
USPC ......................................... 74/473.1; 173/216

(58) Field of Classification Search
CPC ............................... B25F 5/001; B23B 45/008
USPC ............. 74/100.1, 100.2, 342, 352–354, 372, 74/392, 401, 421 A, 470, 473.1, 473.25, 74/473.3, 527, 529, 538, 567; 173/216, 173/217; 200/547–550
See application file for complete search history.

(56) References Cited

U.S. PATENT DOCUMENTS

| | | | | |
|---|---|---|---|---|
| 6,070,675 A | * | 6/2000 | Mayer et al. ..................... | 173/48 |
| 6,186,709 B1 | * | 2/2001 | Hsu ........................... | 408/241 R |
| 6,655,470 B1 | * | 12/2003 | Chen ............................... | 173/47 |
| 7,028,784 B2 | * | 4/2006 | Breitenmoser ................. | 173/20 |
| 7,066,691 B2 | * | 6/2006 | Doyle et al. .................. | 408/124 |
| 2004/0020669 A1 | * | 2/2004 | Spielmann et al. ........... | 173/178 |
| 2005/0215385 A1 | * | 9/2005 | Spielmann et al. ........... | 475/298 |
| 2008/0098842 A1 | * | 5/2008 | Spielmann et al. .......... | 74/473.1 |

FOREIGN PATENT DOCUMENTS

| | | |
|---|---|---|
| CN | 1411958 | 4/2003 |
| CN | 1419997 | 5/2003 |
| CN | 2675956 | 2/2005 |
| CN | 101172339 | 5/2008 |
| DE | 3525208 A1 | 1/1986 |
| DE | 4441793 A1 | 5/1996 |
| DE | 20305224 U1 | 6/2003 |

(Continued)

*Primary Examiner* — Troy Chambers
*Assistant Examiner* — Jake Cook
(74) *Attorney, Agent, or Firm* — Kenyon & Kenyon LLP

(57) ABSTRACT

A handheld power tool is provided with a shiftable gear that has at least two gear steps which are meant to be selected via a user control element disposed adjustably on the housing, in which the user control element actuates a transmission member that acts upon an adjustable gear component, and the user control element is intended to be adjusted between at least two detent positions that correspond to the gear steps of the gear. The transmission member is intended to be adjusted into the detent positions, which can be transmitted to the user control element via the coupling between the user control element and the transmission member.

33 Claims, 2 Drawing Sheets

(56) References Cited

FOREIGN PATENT DOCUMENTS

| | | | |
|---|---|---|---|
| DE | 10222824 | A1 | 12/2003 |
| DE | 102004011617 | A1 | 9/2005 |
| DE | 102006035386 | A1 | 5/2008 |
| EP | 1857228 | A1 | 11/2007 |
| GB | 2383387 | A | 6/2003 |

\* cited by examiner

HANDHELD POWER TOOL WITH A SHIFTABLE GEAR

CROSS-REFERENCE TO RELATED APPLICATION

This application is based on German Patent Application 10 2008 044 273.9 filed Dec. 2, 2008.

BACKGROUND OF THE INVENTION

1. Field of the Invention

The invention relates to a handheld power tool having a shiftable gear.

2. Description of the Prior Art

In German Patent Disclosure DE 101 56 392 A1, a gear shifting device for a multistep gear of an electric power tool is described, in which the gear shifting device has a gearshift lever, which is supported displaceably on the tool housing and is adjustable to a plurality of shifting positions and is operatively connected to a displaceable part of the gear. The positioning motion of the gearshift lever is transmitted by means of a wire clip that is retained adjustably on the housing, and the axial positioning motion of the gearshift lever is converted into an axial adjusting motion of the wire clip that is connected, on the side remote from the gearshift lever, to the displaceable part of the gear and that adjusts the gear axially between the various gear steps.

For securing the gearshift lever, in the gear positions the gearshift lever assumes a detent position, which includes two separately embodied detent springs in the left and right side regions of the gearshift lever, and the detent springs are provided with cams which protrude into recesses in the housing in the detent positions. So that the detent positions will be securely reached, it is necessary that the positioning travel distances of the wire clip which transmits the positioning motion of the gearshift lever and of the detent springs are adapted to one another.

OBJECT AND SUMMARY OF THE INVENTION

Based on this prior art, it is the object of the invention, by simple engineering provisions, to embody a handheld power tool that has a shiftable gear. In one aspect of the invention, secure detent locking is meant to be present in the gear steps.

The handheld power tool of the invention is embodied in particular as an electric handheld power tool, for instance as a cordless screwdriver or cordless drill, and as its drive, it has an electric motor, the rpm of which is converted into a corresponding rotary operating motion via a shiftable gear that has at least two step-down steps. The gear steps are meant to be selected with the aid of a user control element, which is disposed adjustably on the housing and by way of which a transmission member is actuatable that acts on an adjustable gear component. The transmission member serves to transmit and convert the positioning motion of the user control element into a positioning motion of the gear component, as a result of which shifting takes place among the gear steps of the gear.

The user control element is meant to be adjusted between various detent positions, the number of which preferably corresponds to the number of gear steps of the gear. In this way, the user control element is secured in a detent position in each gear step, and mistaken, unintended shifting to the other gear step is prevented.

According to the invention, it is provided that the transmission member assumes the detent positions, which can be transmitted to the user control element via the coupling between the user control element and the transmission member. The detent locking is thus effected via the transmission member, which in this respect is given a dual function, namely first transmitting the positioning motion of the user control element to the shiftable gear component and second securing each gear step as a detent position. This embodiment makes it possible to dispense with additional detent elements that in the prior art act on the user control element, thus reducing the variety of parts that are required. It may also possibly be expedient to provide such additional detent elements on the user control element, thereby providing additional security against unintentional adjustment of the gear step.

A further advantage is considered to be that the operating safety is ensured even over a long period of time, since because of the combination of the positioning travel and the detent function in the transmission member, component tolerances play a lesser role.

The transmission member is preferably supported pivotably on the housing. However, in principle, an axial positioning motion of the transmission member is also possible.

In an expedient embodiment, the transmission member has a detent portion, which engages detent recesses that are located in the housing or in a component solidly connected to the housing. These detent recesses are for instance embodied as detent grooves, which in particular are embodied at angles to one another, which is advantageous with transmission members that are pivotable on the housing, since the pivoting motion of the transmission member is taken into account by way of the angular orientation of the detent grooves.

In a further aspect of the invention, the transmission member is embodied as a wire clip that is disposed in a pivot bearing in the housing, and the pivot bearing is embodied on the housing, and a wire clip portion is received pivotably in the pivot bearing. By way of the pivotability of the wire clip, a leverage can be adjusted with a view to converting the translational positioning motion of the user control element into the translational motion of the adjustable gear component. In particular, conversion of the axial displacement of the user control element into a lesser axial displacement of the gear component is attained, which is associated with an enhanced positioning force on the gear component.

The pivotability of the transmission member is preferably enabled via two guide cams on the housing, which define a pivoting region located between them for receiving the transmission member. The guide cams expediently simultaneously form support faces for bracing the transmission member in the gear steps of the gear, or in other words in the detent positions. The support faces in particular form end stops when each gear step is reached, so that overrotation of the transmission member is precluded.

However, it is also fundamentally possible for the transmission member to be supported with the aid of pivot pins or the like, which engage the housing or a component solidly connected to the housing or are embodied on the housing or a component connected to it.

In an especially simple embodiment, the wire clip fits around the housing, or a component on the housing, in partially circular and preferably semicircular fashion and is pivotably supported on the housing on diametrically opposed sides. The embodiment of the transmission member as a wire clip moreover has the advantage that the wire clip in the positioning direction can be embodied as elastically deformable, making the shifting operations easier, especially upon shifting when the motor is stopped. Advantageously, in other embodiments as well, the transmission member is embodied as elastically deformable, at least in the positioning direction.

A portion of the wire clip is expediently guided in the housing in a groovelike or slitlike recess that is made in the housing and extends parallel to the axis of rotation of the spindle. The face ends of the recess form stops for the wire clip, so that the pivoting motion of the wire clip is limited by the elongated recess. The motion of the wire clip in the recess transversely to its length is also kinematically limited, as a result of which overall an unambiguously defined kinematic pivoting motion of the wire clip is attained.

It is furthermore expedient that, in the event that an additional spring element engages the user control element and secures it in the detent positions, a spring clip with opposed spring detent cams is embodied as the spring element, and the spring detent cams, in the detent positions, engage associated detent grooves on the housing or on a component solidly connected to the housing. The spring detent cams are expediently oriented radially outward and in the detent positions rest in diametrically opposed detent grooves. This embodiment is distinguished by simplicity, since only a single spring clip is required for symmetrical bracing in the detent positions. Because of the spring elasticity, the spring detent cams can be lifted out of their detent positions with a reasonable expenditure of positioning effort. At the same time, a secure hold in the detent positions is assured.

BRIEF DESCRIPTION OF THE DRAWINGS

The invention will be better understood and further objects and advantages thereof will become more apparent from the ensuing detailed description of preferred embodiments taken in conjunction with the drawings, in which.

Figure 1:
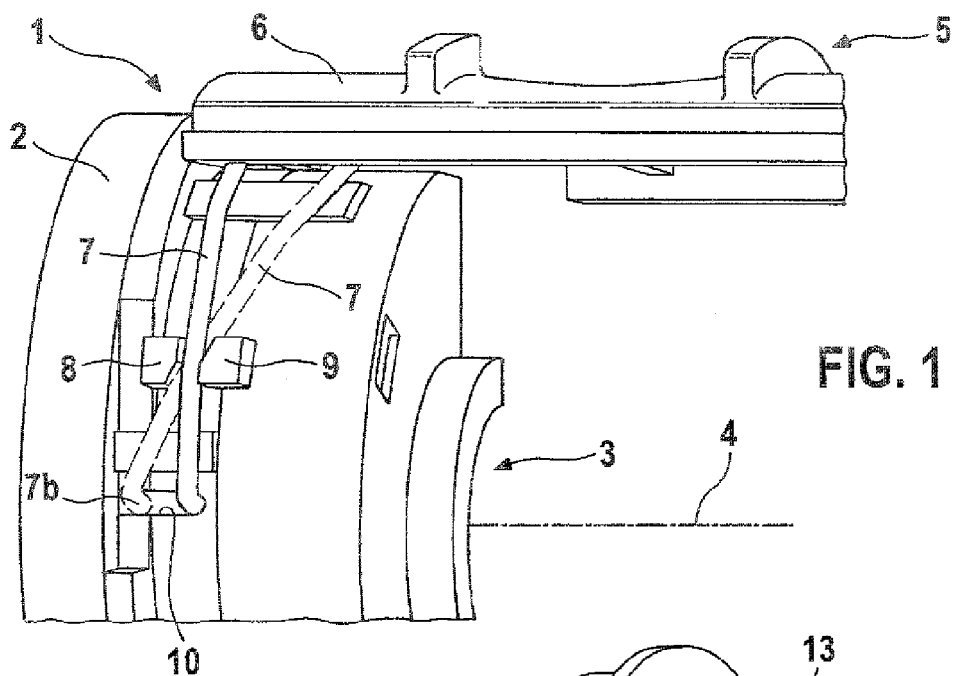
FIG. 1 shows details of a handheld power tool having an adjusting device for shifting the gear of the handheld power tool between various gear steps, and a transmission member thereof embodied as a wire clip.

DESCRIPTION OF THE PREFERRED
EMBODIMENTS

In the drawings, identical elements are identified by the same reference numerals.

In FIG. 1, a detail is shown of a handheld power tool 1 that is provided with an electric motor drive and that is for instance a cordless drill or cordless screwdriver. In a housing 2, the handheld power tool 1 has a gear 3, which is designed as a step-down gear and that transmits the rpm of the electric drive motor to a tool-carrying spindle that rotates about the axis of rotation 4.

The gear, for instance a planetary gear, is designed as a shiftable gear with at least two gear steps, which function with different step-down ratios. For shifting between the gear steps, an adjusting device 5 is provided, which has a user control element 6 on the outside of the housing 2 and also has a transmission member 7 for transmitting the positioning motion to a shiftable gear component, such as a shifting ring gear. The user control element 6 on the outside of the housing 2 is embodied as a gearshift lever, which relative to the housing 2 executes an axial positioning motion parallel to the axis of rotation 4. On its outside, the gearshift lever 6 has grip ribs that facilitate actuation by a user.

The transmission member 7 is embodied as a wire clip, which is capable of executing a pivoting motion relative to the housing 2. In FIG. 1, the wire clip is shown in both of its terminal positions (with a solid line and a dashed line), which correspond to the two gear steps of the gear. In both positions, the transmission member 7 is in a respective detent position.

The pivoting motion of the transmission member 7 is achieved with the aid of two guide cams 8 and 9, which are integrally formed onto the outside of the housing 2 and together form a rotation point for pivoting the transmission member. As seen particularly in FIG. 3, the transmission member 7 is embodied as an approximately semicircular wire clip that fits around the outside of the housing 2. On the opposite side of the housing 2 there are also two guide cams 8 and 9, forming a total of two rotation points for pivoting the wire clip 7. The guide cams 8 and 9 define a pivoting region, located between them, by which the wire clip 7 is guided.

Figure 3:
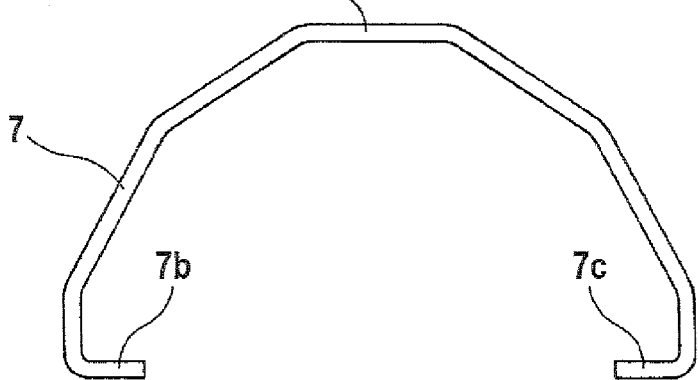
FIG. 3 shows the wire clip in plan view.

As seen in FIG. 3, the wire clip is acted upon in its upper portion 7a by the gearshift lever 6. End portions 7b and 7c of the wire clip protrude through a groovelike or slitlike recess 10, extending in the axial direction, in the housing 2 and act on the gear component supported adjustably in the interior of the housing. In this way, upon pivoting of the wire clip 7 about the rotation point between the two guide cams 8 and 9, an axial positioning motion of the gearshift lever 7 is transmitted into a likewise axial positioning motion onto the adjustable gear component.

Figure 2:
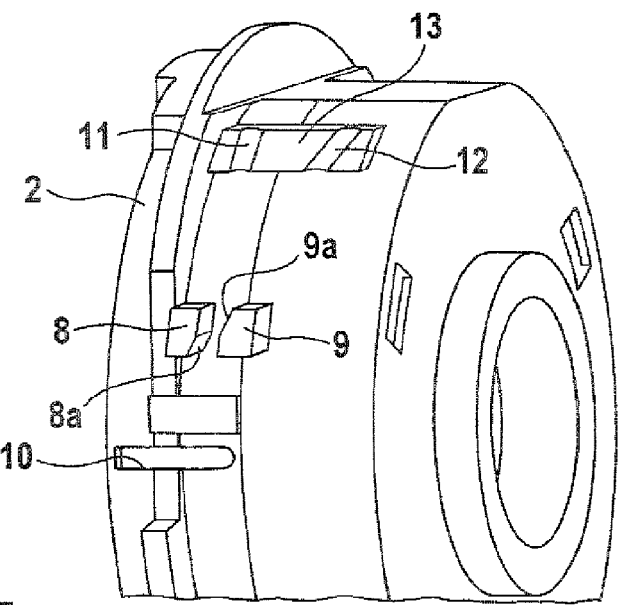
FIG. 2 individually shows the housing of the handheld power tool with two guide cams, which serve to pivot the wire clip, and with two detent grooves that serve to receive the wire clip in the detent positions.

As can be seen from the individual view of the housing 2 in FIG. 2, supported faces 8a and 9a facing one another are embodied on the cooperating guide cams 8, and as shown in FIG. 1, the wire clip 7 rests on these faces and is braced on them in its detent positions. The support faces 8a and 9a limit the pivoting motion of the wire clip 7, which is guided by the pivoting portion located between the guide cams.

On the outside of the housing 2, in the positioning region of the transmission member, there are two detent grooves 11 and 12, which can be engaged in detent locking fashion by the transmission member. The detent grooves 11 and 12 correspond to the respective gear steps of the gear.

The first detent groove 11 extends approximately in the circumferential direction, and the second detent groove 12 extends at an angle to the first detent groove 11, in order to take into account the angular position of the detent member after pivoting about the rotation point between the guide cams 8 and 9. The intervening region 13 between the two detent grooves 11 and 12 is raised slightly but is smooth-walled, so that the transmission member 7 embodied as a wire clip can slide along the intervening region 13 during the pivoting motion.

Figure 4:
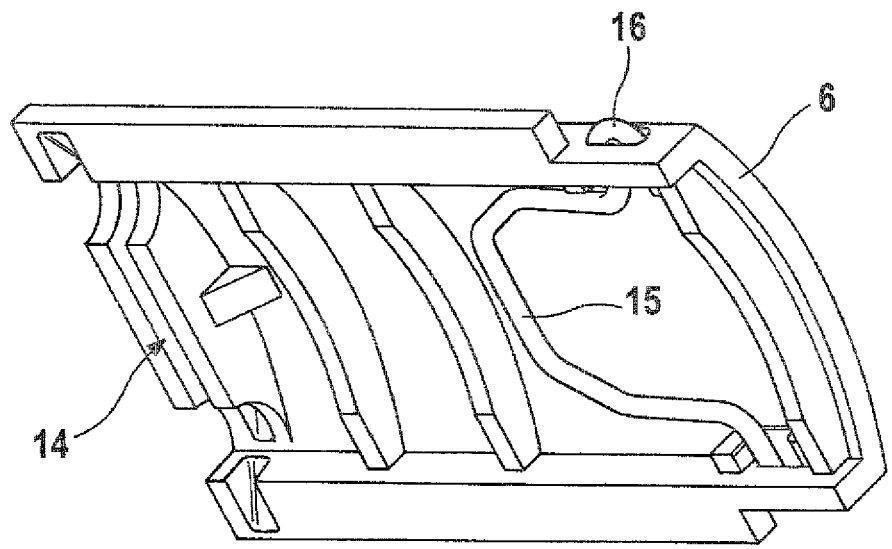
FIG. 4 individually shows the user control element, embodied as a gearshift lever, with a spring clip which is disposed on the inside of the gearshift lever and has radially outward-oriented spring detent cams.
Figure 5:
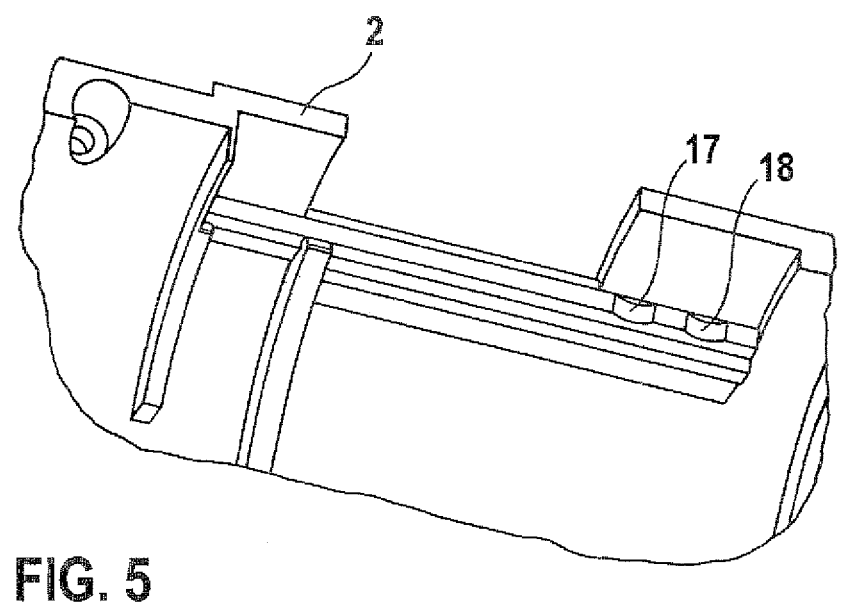
FIG. 5 is a detail of the housing of the handheld power tool, with detent indentations for receiving the spring detent cams of the spring clip of FIG. 4.

As can be seen from FIG. 4, on the underside of the gearshift lever 6 a groovelike, transversely extending receiving portion 14 is provided for receiving the wire clip, and in particular the portion 7a of the wire clip 7. It can also be seen from FIG. 4 that a spring element 15 is disposed on the underside of the gearshift lever 6; the spring element is embodied as a spring clip and has radially outward-oriented, opposed spring detent cams, of which, in the perspective view of FIG. 4, only one spring detent cam 16 is shown. The spring element 15 has the task of assuring an additional detent locking of the gearshift lever 6 on the housing. For that purpose, two axially spaced-apart detent indentations 17 and 18 are provided on the housing 2, as can be seen from FIG. 5, and these are engaged in detent-locking fashion by the radially protruding spring detent cam 16. The two detent indentations 17 and 18 correspond to the detent positions or gear steps of the gear. Because of the spring elasticity, the spring detent cam is urged with force radially outward, so that with moderate positioning effort it is possible to shift the spring detent cam 16 from one detent indentation 17 into the another detent indentation 18 or vice versa; in this positioning motion, which is executed upon an axial displacement motion of the gearshift lever, the spring detent cam 16 reaches the slightly raised area located between the detent indentations 17 and 18 and can slide along this region.

The foregoing relates to preferred exemplary embodiments of the invention, it being understood that other variants and embodiments thereof are possible within the spirit and scope of the invention, the latter being defined by the appended claims.

We claim:

1. A handheld power tool, comprising:
a housing;
a user control element, the user control element being disposed adjustably relative to the housing;
a shiftable gear that has an adjustable gear component and at least two gear steps capable of being selected via the user control element; and
a transmission member that is actuatable by the user control element, the transmission member being configured to act on the adjustable gear component to shift the shiftable gear between the at least two gear steps, wherein the user control element has a receiving portion configured to connect the transmission member to the user control element;
wherein:
the housing or a component fixedly connected to the housing includes at least two detent recesses that define detent positions that correspond to the at least two gear steps of the shiftable gear;
the transmission member is adjustable into the detent positions; and
in the respective detent positions, a detent portion of the transmission member is received in respective ones of the at least two detent recesses.

2. The handheld power tool as defined by claim 1, wherein the detent recesses are embodied as detent grooves.

3. The handheld power tool as defined by claim 2, wherein the detent grooves are oriented at angles to one another.

4. The handheld power tool as defined by claim 1, wherein the transmission member is embodied as elastically deformable in a positioning direction.

5. The handheld power tool as defined by claim 1, wherein the user control element is an axially adjustable adjusting slide.

6. The handheld power tool as defined by claim 1, wherein the user control element is engaged by a spring element, which secures the user control element in respective positions corresponding to the detent positions into which the transmission member is adjustable.

7. The handheld power tool as defined by claim 6, wherein the spring element is embodied as a spring clip with diametrically opposed spring detent cams, which, in the respective positions, engage associated detent indentations.

8. The handheld power tool as defined by claim 7, wherein the spring detent cams are oriented radially outward.

9. The handheld power tool as defined in claim 1, wherein the transmission member is embodied as a wire clip.

10. The handheld power tool as defined in claim 2, wherein a first detent groove extends substantially in a circumferential direction and a second detent groove extends at an angle to the first detent groove.

11. The handheld power tool as defined in claim 2, wherein an intervening region between two detent grooves is raised and is smooth-walled such that the transmission member can slide along the intervening region upon movement between the two detent grooves.

12. The handheld power tool as defined in claim 1, wherein the receiving portion is embodied as a groove that extends in a transverse direction relative to an axial movement of the user control element.

13. A handheld power tool, comprising:
a shiftable gear that has at least two gear steps capable of being selected via a user control element disposed adjustably relative to a housing;
a transmission member that is actuatable by the user control element and is configured to act upon an adjustable gear component, wherein:
the user control element is configured to be adjusted between at least two positions that correspond to the gear steps of the shiftable gear and that correspond to at least two positions into which the transmission member is configured to be adjusted, the adjustment of one of the user control element and the transmission member causing the adjustment of the other of the user control element and the transmission member via a coupling between the user control element and the transmission member;
the transmission member is embodied as a wire clip including an upper portion and end portions, the wire clip supported pivotably in a pivot bearing at least one of in and on the housing; and
the wire clip cooperates with two guide cams of the pivot bearing disposed on the housing toward the end portions of the wire clip.

14. The handheld power tool as defined by claim 13, wherein in the pivot bearing, for pivoting the transmission member, the two guide cams are embodied on the housing, which define a pivoting region, located between them, for receiving the transmission member.

15. The handheld power tool as defined by claim 13, wherein the guide cams have support faces, oriented toward one another, for bracing the transmission member in the individual gear steps of the gear.

16. The handheld power tool as defined by claim 13, wherein a portion of the wire clip is guided in a recess in the housing.

17. The handheld power tool as defined by claim 16, wherein face ends of the recess form stops for the wire clip.

18. The handheld power tool as defined by claim 16, wherein the recess extends parallel to an axis of rotation.

19. The handheld power tool as defined by claim 17, wherein the recess extends parallel to an axis of rotation.

20. The handheld power tool as defined in claim 13, wherein the housing includes at least two detent recesses that define detent positions for the wire clip, and the detent positions correspond to the at least two positions into which the transmission member is configured to be adjusted.

21. The handheld power tool as defined in claim 20, wherein the at least two detent recesses are oriented nonparallel to one another.

22. The handheld power tool as defined in claim 13, wherein the user control element is an axially adjustable adjusting slide.

23. The handheld power tool as defined in claim 13, wherein the user control element is engaged by a spring element, which secures the user control element in the at least two positions.

24. The handheld power tool as defined in claim 1, wherein the transmission member is supported, and received pivotably, in a pivot bearing embodied on the housing.

25. The handheld power tool as defined in claim 24, wherein the pivot bearing includes two guide cams which define a pivoting region, located between the guide cams, for receiving the transmission member.

26. The handheld power tool as defined in claim 25, wherein the two guide cams include support faces, oriented toward one another, for bracing the transmission member in the respective gear steps of the shiftable gear.

27. The handheld power tool as defined in claim 24, wherein the transmission member includes an upper portion and end portions, the transmission member being supported pivotably in the pivot bearing toward the end portions.

28. The handheld power tool as defined in claim 1, wherein the transmission member includes an upper portion connected to the user control element and end portions acting on the adjustable gear component of the shiftable gear.

29. The handheld power tool as defined in claim 28, wherein the detent portion of the transmission member is closer to the upper portion of the transmission member than to the end portions.

30. The handheld power tool as defined in claim 1, wherein the housing includes two recesses through which the transmission member protrudes to act on the adjustable gear component.

31. The handheld power tool as defined in claim 30, wherein the at least two detent recesses are disposed at an upper portion of the housing, spaced apart from the two recesses.

32. The handheld power tool as defined in claim 30, wherein the at least two detent recesses are disposed at an upper portion of the housing, and the two recesses are disposed at a lower portion of the housing.

33. The handheld power tool as defined in claim 30, wherein the transmission member is supported, and received pivotably, in a pivot bearing embodied on the housing, and the pivot bearing is disposed closer to the two recesses than to the detent recesses.

* * * * *